United States Patent [19]
Rutledge

[11] Patent Number: 5,831,593
[45] Date of Patent: Nov. 3, 1998

[54] LOW-POWER STANDBY MODE FOR A REMOTE SENSING DEVICE

[75] Inventor: Joseph Dela Rutledge, Mahopac, N.Y.

[73] Assignee: International Business Machines Corporation, Armonk, N.Y.

[21] Appl. No.: 586,270

[22] Filed: Jan. 16, 1996

[51] Int. Cl.$^6$ ....................................... G09G 5/00
[52] U.S. Cl. ........................ 345/156; 348/734; 345/158
[58] Field of Search ..................... 345/156, 158, 345/161, 169, 211, 212; 395/750.01, 750.08; 348/734; 340/825, 825.61, 825.64

[56] References Cited

U.S. PATENT DOCUMENTS

| | | |
|---|---|---|
| 4,313,226 | 1/1982 | Eder . |
| 4,591,914 | 5/1986 | Hakamada et al. . |
| 4,649,373 | 3/1987 | Bland et al. . |
| 4,698,748 | 10/1987 | Juzswik et al. . |
| 4,788,661 | 11/1988 | Morita . |
| 4,825,209 | 4/1989 | Sasaki et al. . |
| 4,918,995 | 4/1990 | Pearman et al. ................. 73/861.02 |
| 4,982,279 | 1/1991 | Ishii et al. . |
| 4,992,951 | 2/1991 | Glowczewski et al. . |
| 5,187,469 | 2/1993 | Evans et al. . |
| 5,283,559 | 2/1994 | Kalendra et al. ................ 35/168 |
| 5,541,622 | 7/1996 | Engle et al. ..................... 345/168 |

FOREIGN PATENT DOCUMENTS 2 150 721  7/1985  United Kingdom .

OTHER PUBLICATIONS

"Analog Joystick Interface Emulation Using A Digital Counter", IBM Technical Disclosure Bulletin, vol. 37, pp. 73–74 Aug. 1994.

*Primary Examiner*—Chanh Nguyen
*Assistant Examiner*—Xu-Ming Wu
*Attorney, Agent, or Firm*—Whitham, Curtis & Whitham; Stephen C. Kaufman

[57] ABSTRACT

A battery powered sensing device using an analog sensor has electronic circuitry that maintains sensitivity and calibration of the sensing device during quiescent periods with very little power drain. In one implementation, a joystick is provided with a sensitive analog sensor, such as strain gauges, connected to the shaft of the joystick. The strain gauges are connected in a bridge circuit across which a voltage is applied. Three operational amplifiers are connected to combinations of the strain gauges in the bridge circuit to generate X, Y and Z output voltages corresponding to the combined signals generated by the strain gauges. A microprocessor receives outputs from the sensitive analog sensor and generates a sample signal and performs a recalibration of sampled signals during periods of inactivity. The sampling interval for recalibration is increased in periods of extended inactivity, greatly reducing the current draw on the battery power supply and greatly reducing power requirements of the sensing device.

20 Claims, 5 Drawing Sheets

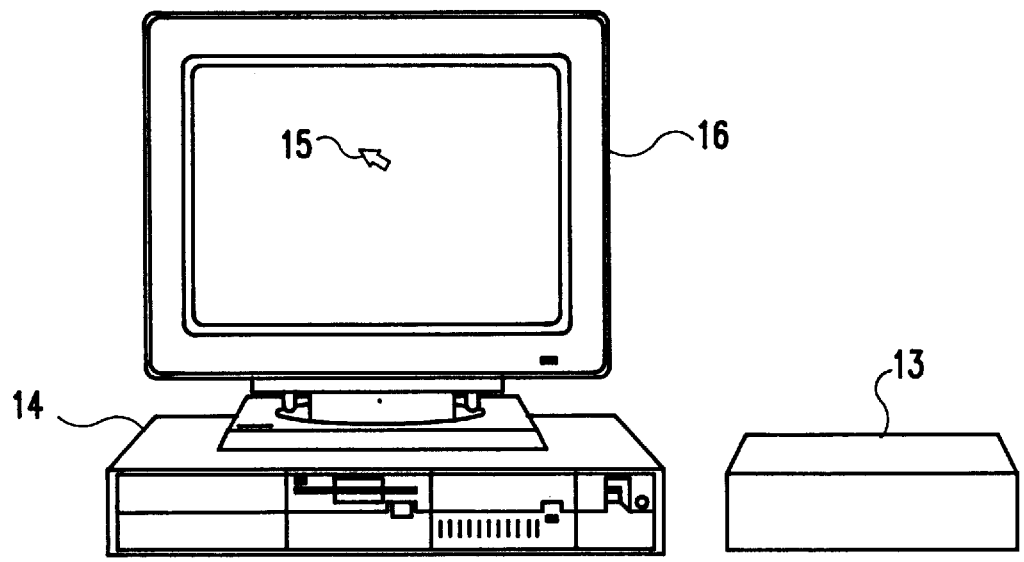
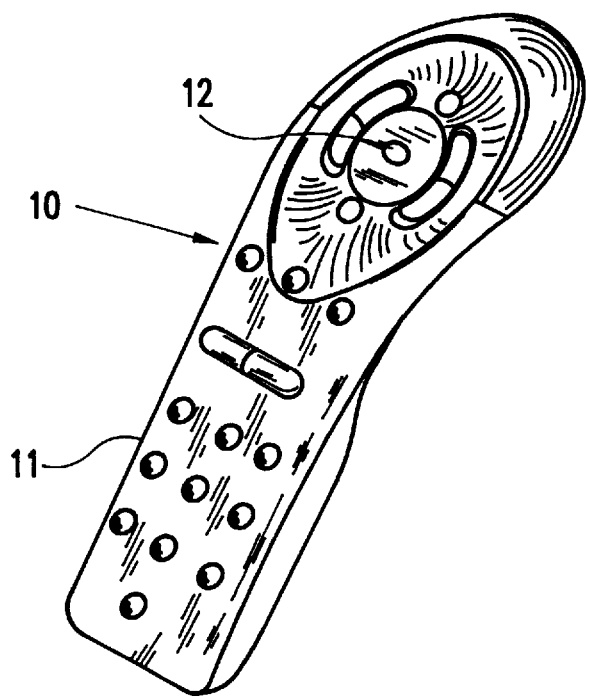
FIG.1

LOW-POWER STANDBY MODE FOR A REMOTE SENSING DEVICE

BACKGROUND OF THE INVENTION

1. Field of the Invention

The present invention generally relates to remote sensing devices which alternate between an "active" and a "standby" state, such that the device must be in the "active" state whenever its sensed quantities are changing rapidly, but which should not respond to slow changes, and with power drain requirements such that the device must be generally kept in the "standby" state whenever it is not required to be in the "active" state. A particular example is a remote control device for controlling a cursor on a computer or television screen, which must be "on" whenever it is used, but will be actually in use only a small fraction of the time, and must have a battery life measured in years.

2. Background Description

In an application such as a television (TV) remote control device, battery life on the order of years is required, but the device must respond immediately to user input. A user may pick up the device and immediately use it to control, for example, TV volume. In current TV remote controls, the user input is a switch closure, which may be used to activate the device, switching it from a quiescent, very low power state to full activity, which needs to be maintained only during the period of actual use. Typically, such remote control devices transmit via an infrared (IR) link an encoded signal indicating a channel selection or other control function entered by the user. Thus, when the user wants to decrease the TV volume, the down arrow for volume is pressed. This form of simple encoding and control allows the electronics of the remote control to normally be in a low-power, quiescent state most of the time and become active only upon the press of one of the buttons on the remote control device by the user.

A remote control device used to control a cursor on a display screen, like the remote control for a TV, must be compact and have long battery life. A small joy stick operable by the tip of the user's thumb or finger provides a very compact user input. Such a joy stick can be incorporated into a wireless remote control device very much like the remote control for a TV, or it can be incorporated into a compact keyboard which, again, can have a wireless IR link or can be wired to a battery powered computer system, such as a laptop computer.

While traditional cursor pointing devices, such as a mouse or track ball, have variously used optical and electrical sensors to detect movement of the mouse or trackball, such sensors do not lend themselves to a compact design. A small isometric joy stick, as used in one implementation of the subject invention, uses sensitive analog sensors, such as strain gauges, to provide the most compact sensing structure. However, if the user input is the displacement of a sensitive analog sensor such as an isometric joystick from its neutral state, there is a double problem. The analog sensor must appear to the user to be continuously active, and its neutral state must be kept in calibration so that a drift induced, for example, by changing room temperature does not produce a false control signal. Calibration is maintained by detecting, from the properties of the signal, when the sensor is or is not being touched by the user, and then adjusting the neutral state to that sensed when it is not being touched. This detection requires several seconds of activity.

Continuous activity requires substantial power, defeating the battery life objective. Continuous activity can be adequately simulated by very brief activation at frequent intervals, say several times per second. When the user begins to use the sensor, this can be detected at the next activation and the device turned full on to respond immediately to the user's wishes. However, this requires that the device be already in calibration, which seems to require that it have been already turned on for some period in anticipation of user input. This, of course, is not feasible since user demand is unpredictable. To the best of applicant's knowledge, all currently available remote control devices require a switch closure to signal the beginning of a period of activity.

More generally, there are many applications in which a remote sensing unit, which must operate with minimal power consumption, is required to detect and report accurately any sudden change from "normal" in the value of a measured variable, while ignoring slow changes due to environmental or other effects. A space probe monitoring an ambient field (electrical, magnetic, radiant, gravitational, etc.), a telemetry device monitoring physiological variables (temperature, heart rate, etc.) in a human or animal subject, an intrusion detector which responds to either a sudden change in radiant temperature produced by the entry of a warm intruder or a shift in echo frequency produced by movement, are applications which may benefit from the teachings of the invention. In each of these, the quantity being sensed is subject to slow variations which are insignificant, and to rapid variations which must be detected and reported with little delay, with strong restraints on total power consumption. The present invention is applicable in these and similar situations.

SUMMARY OF THE INVENTION

It is therefore an object of the present invention to provide a battery powered remote control device, incorporating an analog sensor which requires frequent recalibration but which can respond effectively immediately to user input even after a long period when it is not being used and yet has very low power drain during such periods.

According to one implementation of the invention, there is provided a battery powered remote control device including a sensitive analog input device, such as an isometric joy stick using strain gauge technology, which requires substantial power when activated. This device is effectively immediately responsive to a user at any time yet has a total power drain several orders of magnitude less than that required for continuous activation. This is accomplished by

- detecting occasions of use by analysis of the output of the sensor,
- following periods of non-use, activating the sensor only very briefly (for a single sample) at intervals increasing with the time elapsed since the last occasion of use, the maximum interval being such as to appear negligible to the user, giving a minimum duty cycle of the order of 1/1000,
- if the sensor output is found to be consistent with non-use and correct calibration, no further action is taken, otherwise the sensor is activated and its signal analyzed, and
- if the analysis indicates use, then the period of non-use is ended, otherwise, calibration is corrected and intermittent activation continues.

In a preferred embodiment of the invention, the joystick consists of a ceramic shaft embedded in the circuit board at one end and fitted with a rubber cap at the other end. The shaft has four thick-film ceramic strain gauges silk-screened on its sides. Signals sampled from various combinations of the four strain gauges are processed by special circuitry and a microprocessor to measure the force applied to the cap in the X, Y and Z directions. The microprocessor uses these measurements to generate cursor motion and action signals, and to maintain the calibration of the measurement circuitry as required to cancel irrelevant environmental effects such as ambient temperature. It also determines whether the device is in use or not, and during idle periods it reduces the sampling rate as described above.

BRIEF DESCRIPTION OF THE DRAWINGS

The foregoing and other objects, aspects and advantages will be better understood from the following detailed description of a preferred embodiment of the invention with reference to the drawings, in which:

FIG. 1 is a pictorial diagram showing a remote control device incorporating a joy stick for control of a cursor on a display screen;

DETAILED DESCRIPTION OF A PREFERRED EMBODIMENT OF THE INVENTION

Figure 2:
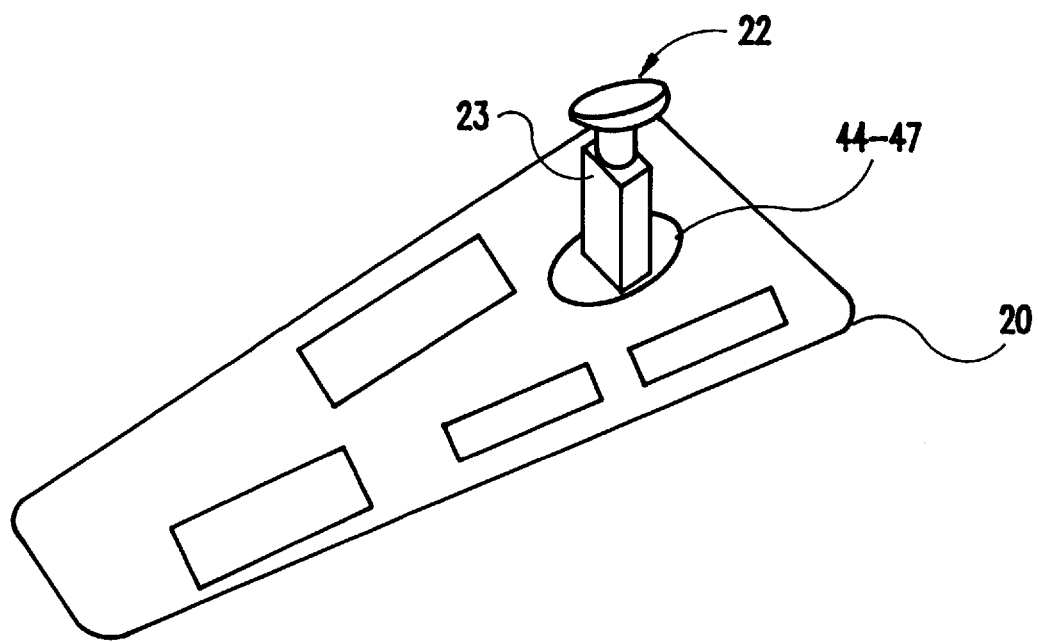
FIG. 2 is a pictorial diagram showing a circuit board on which the joystick is mounted.

Referring now to the drawings, and more particularly to FIG. 1, there is shown a hand held remote control device 10 having a plurality of function keys or buttons, generally indicated at 11. A small joystick 12 is sensitive to forces in the horizontal, X and Y, and vertical, Z, directions. As shown in more detail in FIG. 2, this joystick consists of a ceramic shaft 23 embedded in the circuit board 20 of the remote control device at one end and a rubber cap 22 at the other end. The shaft 23 has four thick-film ceramic strain gauges 44 to 47 silk-screened on its sides. Force on the joystick results in bending or compression of the shaft of the joystick, and consequent elongation or compression of strain gauges bonded to the sides of the joystick shaft near its base, causing changes in the electrical resistance of the gages proportional to the corresponding directional components of the applied forces. The specific construction of the joystick may be that of the IBM TrackPoint III.

Returning again to FIG. 1, the microprocessor, with associated circuitry contained in the hand-held control 10, analyzes the gauge resistances and derives motion and action (button-press) data for the pointing cursor, and transmits these as an encoded infrared (IR) signal to a receiver 13 connected to, for example, a serial port of a personal computer or "smart" television set 14. The receiver 13 decodes the signal and transmits the data to the host (personal computer or smart television set) in a standard format as used in a conventional pointing device, such as a mouse. The infrared transmission system and mouse communication protocol may be any of those well known in the art. The mapping of joystick force to cursor movement signals is that used by the IBM TrackPoint III product, or any similar pointing stick.

In another application of the joystick, the joystick may be incorporated into a keyboard which may be battery powered and communicate via an IR link with a receiver 13 as shown in FIG. 1 or it may be incorporated into a battery powered computer, such as a lap top computer.

As mentioned, the use of strain gauge sensors allows for a very compact design of the cursor pointing device. However, strain gauge sensors require periodic recalibration. Such recalibration necessarily entails a current drain from the power source. In the case of battery powered devices such as that shown in FIG. 1, battery life can be considerably shortened. The present invention overcomes this problem with a stand-by power algorithm implemented in the circuit shown in FIG. 3, to which reference is now made.

Figure 3:
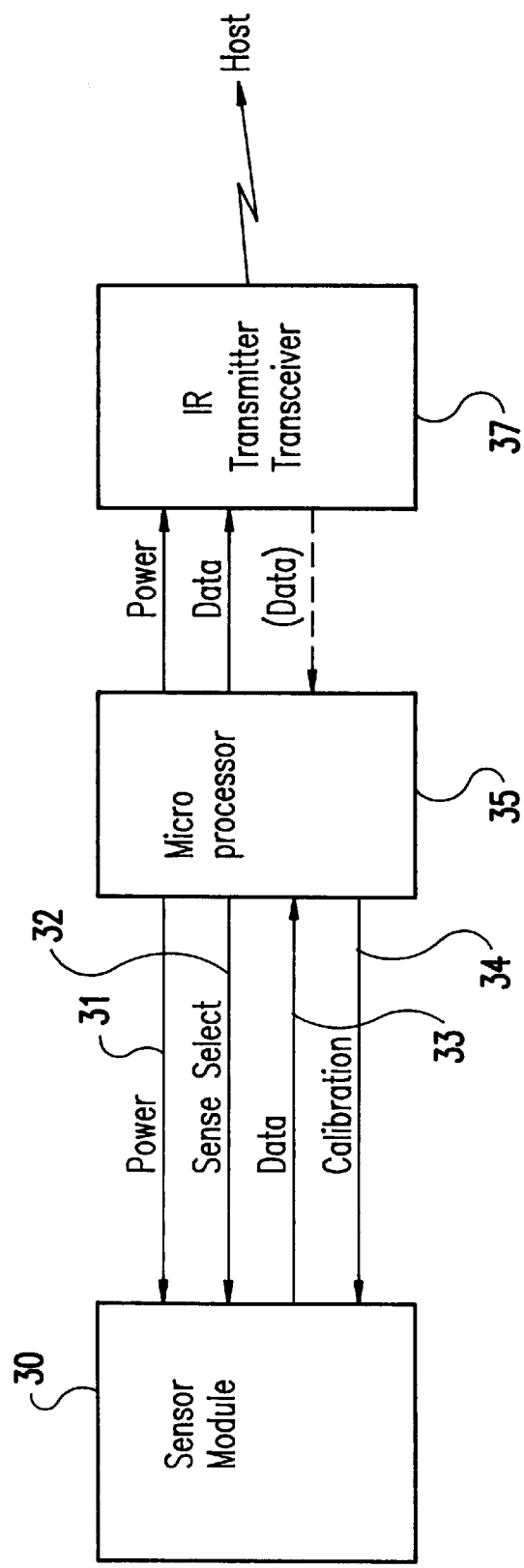
FIG. 3 is a high level block diagram showing the major components of the preferred implementation of the invention and their interactions.

FIG. 3 is a high level block diagram of the preferred implementation of the invention. The sensor module 30 contains the strain gauges and associated analog and analog-to-digital (A/D) conversion circuitry. It is powered from the microprocessor 35 over power bus 31 only when a sample is required; otherwise, it is unpowered. In full activity, it is powered for about one millisecond out of every ten. When a sample is required, power is applied, a signal on the sense select line 32 specifies what is to be measured (i.e., X, Y or Z), and calibration data is supplied on calibration line 34. The sensor module responds with digital data on the data line 33. Normally, each of X, Y and Z is measured, successively, within the 1 msec sample period. The data received are processed by the microprocessor 35 to produce movement and action data when appropriate for transfer to the infrared (IR) transmitter, which transmits them to the host receiver 13 (FIG. 1). This link is one-way in the preferred embodiment, but it could easily be two-way if required for a specific application.

Figure 4:
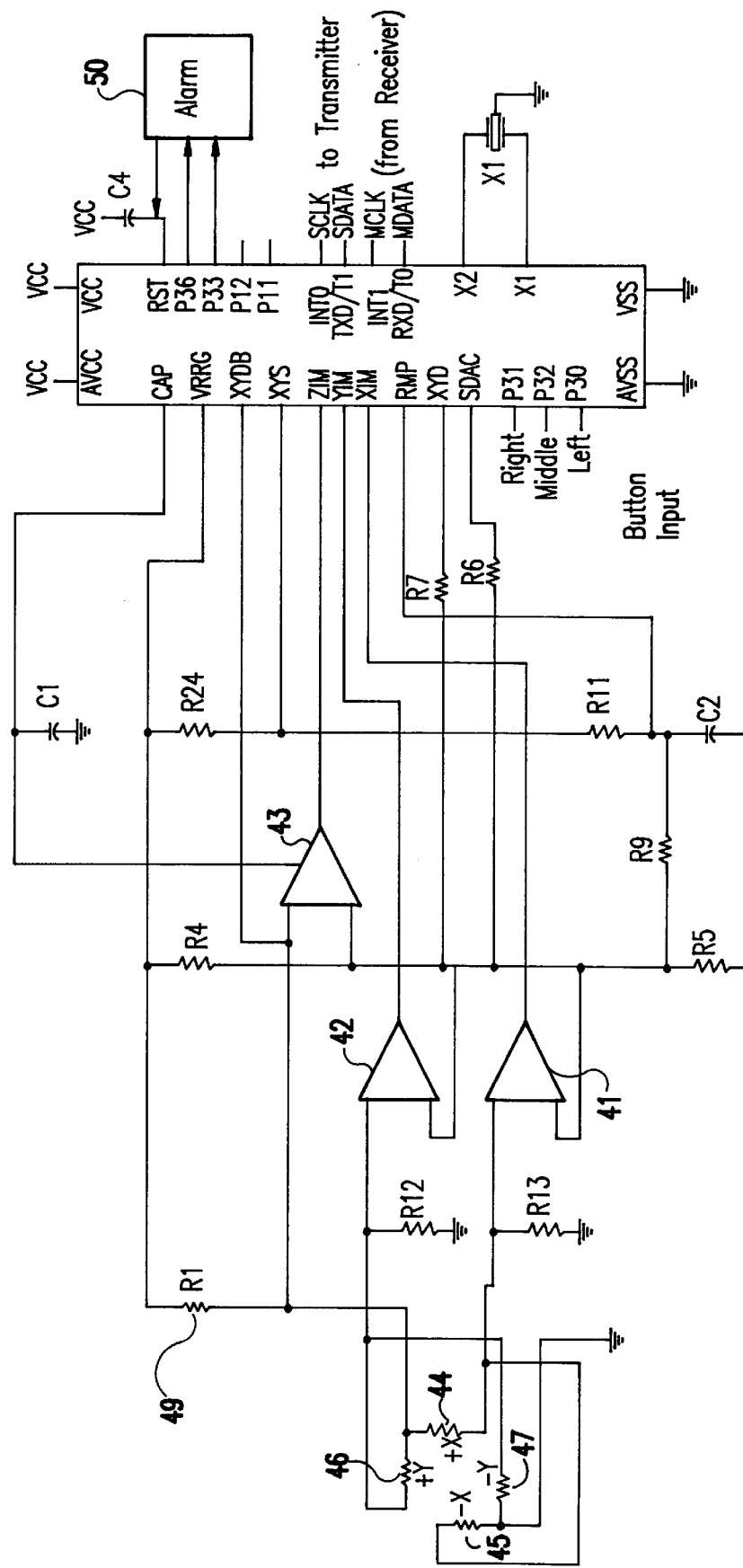
FIG. 4 is a detailed schematic diagram of the sensor module and microprocessor as used in the preferred implementation of the invention.

The details of the implementation are given in FIG. 4. Here, many of the circuit elements which are in the sensor module 30 are included in the microprocessor 40. This may be a commercially available unit, such as the 83C754 or 87C754 (written ambiguously 8xC754) microprocessor manufactured and sold by Philips Semiconductors. The three operational amplifiers 41, 42 and 43 shown may be contained, for example, in a quad unit LMC6034 operational amplifier produced by National Semiconductor Corporation. The joystick strain gauges 44 to 47, when powered from pin 16 or 17 of the 8xC754 microprocessor, produce voltages depending on the forces applied to the cap of the joystick. The four strain gauges are connected in 2 half-bridge circuits connected in parallel. Operational amplifier 41 is connected to receive a combined signal generated by the strain gauges 44 and 45, operational amplifier 42 is connected to receive a combined signal generated by the strain gauges 46 and 47, and operational amplifier 43 is connected to receive a combined signal from the strain gauges 44 through 47 and fixed resistor R1. The useful signals are quite small (e.g., resolution of about 30 microvolts required, in voltages of about 2 volts), so each operational amplifier is operated in differential open loop mode as part of a zero-threshold comparator, in conjunction with circuitry contained in the 8xC754 microprocessor. The reference voltage (derived from the calibration data 34 shown in FIG. 3) is supplied from pin 19 or 20 of the 8xC754 microprocessor combined with a voltage ramp generated by resistor R11 and capacitor C2 (under control of pin 12 of the 8xC754 microprocessor) to sweep across the range of interest for the measurement being made. The time of coincidence of the voltage from the strain gauge assembly and the sweeping reference voltage (signaled by a voltage step at the appropriate one of pins 9, 10 or 11) is noted by a timer-counter in the 8xC754 microprocessor and is the data supplied to the microprocessor.

The X, Y and Z data received by the microprocessor are processed according to standard algorithms not relevant to this invention to generate motion and action signals, as described above.

In the preferred implementation, these signals are the same as would be transmitted by a conventional pointing device, such as a mouse, representing movement in the horizontal plane and activation and release of button switches. Typically, these signals are used to control the movement of a cursor on the display screen, and to indicate selection or other actions connected therewith, but the actual use to which they are put depends on the system and application programs in use in, for example, the personal computer or "smart" television 14 shown in FIG. 1.

The voltage signals supplied by the strain gages are quite small. One unit in the digital form corresponds to about 30 microvolts ($\mu$V), or less than one part in 100,000 of the working voltage of the circuit. Thus, the zero set points are subject to slow drift resulting from changing ambient conditions, especially temperature. Proper response to the user requires that the signals be sampled on the order of every ten milliseconds (msec) during active use. To reduce power drain, the sampling current is shut off except when a measurement must actually be made. The measurement cycle requires about 1 msec for a duty cycle in the fully active state of about 10%. The microprocessor also is in idle mode, with current drain of about 300 microamperes ($\mu$A) for about 8.5 out of 10 msec, yielding a net average drain of about 2.5 milliamperes (mA) when the device is in active use. Determination that the device is not in active use requires a longer time, typically, about three seconds. It is only when this determination has been made that the zero set points can be adjusted and the device put into a low-drain standby mode. In standby mode, the device executes sampling cycles with a frequency decreasing with elapsed time since the last active use. As long as the values sampled are consistent with previous values (e.g., within one digital unit), no action is taken. If a greater difference is found, the device enters a provisionally active mode, analyzing for activity, for the required time, typically about three seconds. If no activity is found, the zero set point is adjusted to the new values and standby mode is continued; otherwise, the device returns to full active mode.

The "Alarm" unit 50 is a timer circuit, operating at a low clock rate (perhaps 32 kc) which, when started by a pulse from pin 3 of the 8XC754, returns a pulse to pin 5 (RST) of the 8XC754 after a delay of 50, 100, 200, or 1000 m seconds, as set by a prior signal on line from pin 28. This allows the 8XC754 to be put into Power Down mode between sampling times.

The wake up delay for the pointing device is at most the maximum sampling period. An acceptable value is between one and two seconds. At one second, the sampling power drain is reduced by a factor of almost 100, but calibration is maintained. The microprocessor has a power drain while in power down mode of 80 $\mu$A and power drain during sampling of 6 mA, so average drain for sampling with a one second sampling interval is 86 $\mu$A.

The stand-by power algorithm implemented by the microprocessor is based on the following definitions. Xa, Ya and Za are X, Y and Z values at data line 33 (FIG. 3). Xo, Yo and Zo are current zero values for these readings. Thus, an output from the joystick is defined as $X=Xa-Xo$, $Y=Ya-Yo$, and $Z=Za-Zo$. For purposes of calibration, Xo, Yo and Zo are reset to current values of Xa, Ya and Za, respectively, whenever Xa and Ya each vary by no more than one unit during a period of 2.8 seconds. "Activity" is defined as any occurrence of $|X|>1$ or $|Y|>1$ or $|Z|>1$, where "1" is the minimum quantification from the A/D conversion. Time since last activity is the clock time since the most recent occurrence of activity, except that when zero reset occurs, activity at the beginning of that 2.8 second period is ignored.

An example of the schedule of sampling interval with elapsed time since last active use is shown in the table below:

| Time since last active use | <1 min | 1–2 min | 2–4 min | 4–10 min | >10 min |
|---|---|---|---|---|---|
| Sampling interval | 10 msec | 50 msec | 100 msec | 200 msec | 1 sec |

For the example of a TV remote control application, the device would be in the last column of the table most of the time (e.g., overnight and whenever the set has not been actively controlled for ten minutes or more). Power drain is a constant 80 $\mu$A plus 6,000 $\mu$A for 1 msec out of every second, for an average drain of 86 $\mu$A, which is comparable to the passive leakage drain of the type of batteries typically used in such devices. Consequently, battery life in an unused device will be similar to the shelf life of the batteries. On the other hand, the device will appear to the user to respond instantaneously, except perhaps when it is first picked up after a long (i.e., greater than ten minutes) period of disuse, when there may be a just noticeable delay. Clearly, the maximum sampling interval could be shortened if necessary without major impact on battery life.

Figure 5:
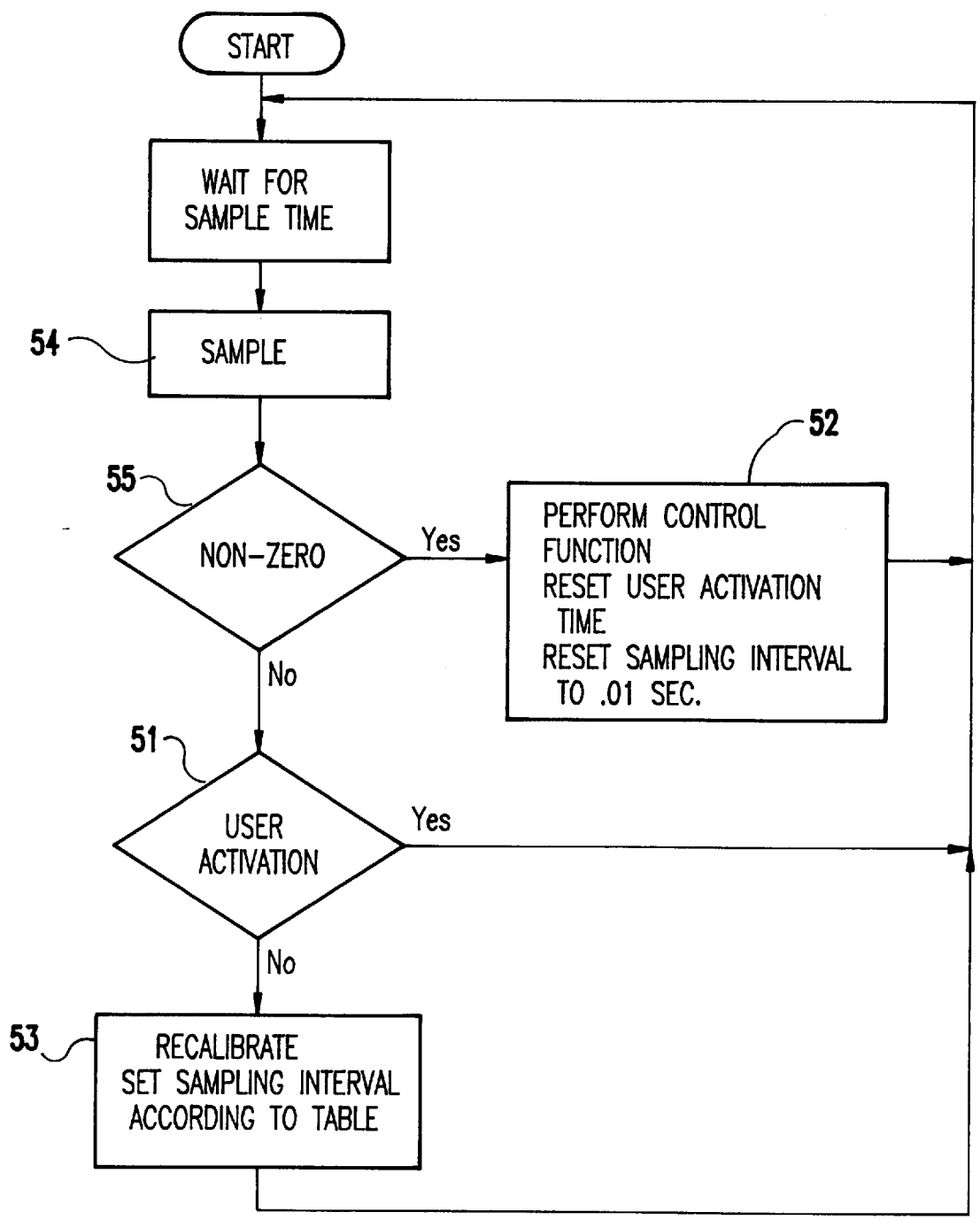
FIG. 5 is a flow diagram showing the logic of the program which controls the microprocessor in the circuit shown in FIG. 4.

Referring to FIG. 5, the output of the sensor is sampled in function block 54. If the calibrated sample values are non-zero (block 55) the necessary control functions are performed in function block 52. The sample interval is set to minimum (0.01 sec), and the 'user activity' timer is reset to zero; the "time since last active use" is not changed. If the calibrated sample values are not non-zero, a determination as to whether there has been user activation is made in block 51 as described above. If it is determined that there has been no user activation, calibration values are reset and the sampling interval is adjusted according to the table above. In all cases, the process returns to 'start' to repeat.

While the invention has been described in terms of a single preferred embodiment, those skilled in the art will recognize that the invention can be practiced with modification within the spirit and scope of the appended claims and, in particular, the invention may be applied to those situations where a quantity being sensed is subject to slow variations which are insignificant and to rapid variations which must be detected and reported with little delay and where there are strong restraints on total power consumption.

Having thus described my invention, what I claim as new and desire to secure by Letters Patent is as follows:

1. A method for reducing power requirements of a sensing device subject to long periods during which the sensing device must be inactive but alert for rapid change while actively maintaining calibration against a slowly changing ambient, comprising the steps of:

monitoring the sensing device at a selected time interval;
  if a variable sensed by the sensing device has a value indicating an extended period of inactivity, then
    adjusting the selected interval to a longer time interval;
    determining if calibration of the sensing device is correct; and if the calibration of the sensing device is not correct, then correcting the calibration of the sensing device;

otherwise, if the variable sensed by the sensing device has a value indicating activity, then performing a function in response to the sensed variable.

2. The method according to claim 1, further comprising the step of providing power to the sensing device only when data is required from the sensing device.

3. The method according to claim 2 further comprising the step of providing power to the microprocessor with a battery.

4. The method recited in claim 1 wherein the function performed is reporting a value derived from the sensed variable to a host system.

5. The method recited in claim 1 wherein the function performed is a commanded operation according to a content of the sensed variable.

6. The method recited in claim 1 wherein the sensed variable is a force having a magnitude and direction.

7. The method recited in claim 6 wherein the force is resolvable in at least two dimensions.

8. The method according to claim 2, comprising performing the steps with a microprocessor.

9. A battery powered remote control device comprising:

a sensing device subject to long periods during which the sensing device must be inactive but alert for rapid change while actively maintaining calibration against a slowly changing ambient;

means for sampling at least one analog signal from the sensing device and generating a digital output proportional to the analog signal; and a microprocessor, connected to receive the digital output from the sampling means, for taking a sample from said sensor device during periods of inactivity and performing a recalibration based on the sampled signal, the sampling interval for recalibration being increased in periods of extended inactivity.

10. The battery powered remote control device recited in claim 9 wherein the sensing device comprises a joystick having an analog sensor that generates the analog signal due to flexure of the joystick.

11. The battery powered remote control device recited in claim 10 further comprising transmitter means for transmitting encoded control signals generated by said microprocessor in response to flexure of the joystick.

12. The battery powered remote control device recited in claim 10 wherein the joystick comprises one of a ceramic, a metal and a plastic shaft to which the analog sensor is affixed.

13. The battery powered remote cursor control device recited in claim 12 wherein the analog sensor comprises four strain gauges mounted about the joystick causing resistances of said four strain gauges to vary as functions of horizontal and vertical forces applied to said joystick.

14. The battery powered remote control device recited in claim 13 wherein the four strain gauges are connected in two half-bridge circuits and further comprising first, second and third operational amplifiers connected to said bridge circuit, said first operational amplifier being connected to receive a combined signal generated by a first pair of the strain gauges, the second operational amplifier being connected to receive a combined signal generated by a second pair of the strain gauges, and the third operational amplifier being connected to receive a combined signal from all four of said strain gauges connected in a half bridge with a fixed resistor.

15. The battery powered remote control device recited in claim 9 wherein part or all of said sampling means is packaged with the microprocessor on the same chip.

16. A battery powered remote control device which performs periodic self calibration against a changing ambient during periods of user inactivity, comprising:

a sensor for sensing a user input to perform a remote control function to control a remote host system;

a microprocessor connected to receive said user input and generate a corresponding remote control function therefrom;

a transmitter connected to said microprocessor for transmitting said corresponding remote control function to said host system; and calibration means, associated with said microprocessor, for activating said sensor after a predetermined period of user inactivity and sampling a returned signal from said sensor, and using said returned signal to perform a sensor calibration, wherein said predetermined period is progressively increased during extended periods of user inactivity.

17. A battery powered remote control device which performs periodic self calibration as recited in claim 16 wherein said sensor comprises a joystick connected to strain gauges.

18. A battery powered remote control device which performs periodic self calibration as recited in claim 16 wherein said transmitter comprises a transceiver for receiving signals from said host system.

19. A battery powered remote control device which performs periodic self calibration as recited in claim 18 wherein said remote control comprises a television remote control.

20. A battery powered remote control device which performs periodic self calibration as recited in claim 16 wherein said remote control comprises a computer remote control.

* * * * *